(No Model.)
A. T. HEISER.
HANDLE FOR SHOVELS AND SPADES.
No. 330,481. Patented Nov. 17, 1885.
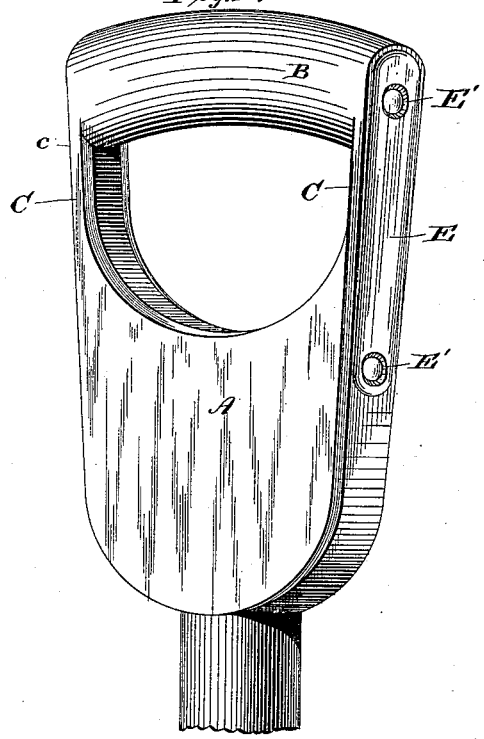
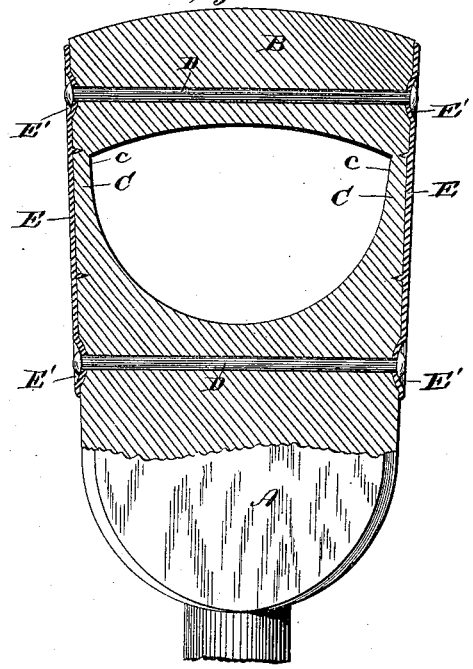
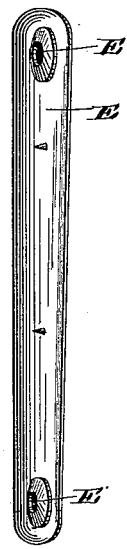
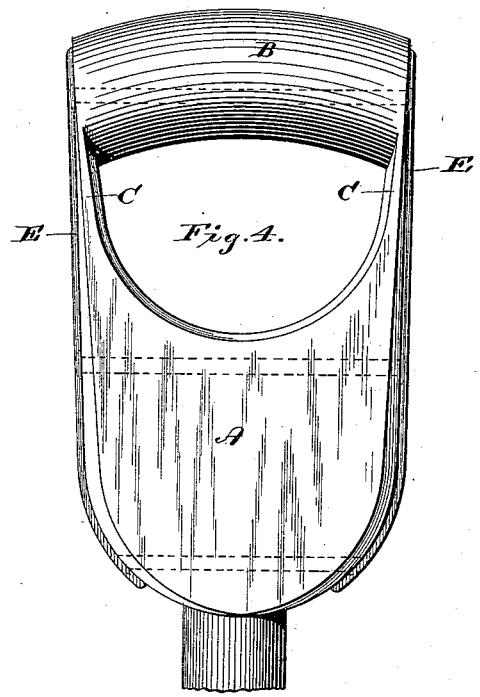
Witnesses.
Chas. R. Burr
A. S. Stewart
Inventor.
Adolph T. Heiser
by Church & Church
His Attorneys.

UNITED STATES PATENT OFFICE.

ADOLPH T. HEISER, OF SCRANTON, PENNSYLVANIA.

HANDLE FOR SHOVELS AND SPADES.

SPECIFICATION forming part of Letters Patent No. 330,481, dated November 17, 1885.

Application filed September 3, 1885. Serial No. 176,111. (No model.)

*To all whom it may concern:*

Be it known that I, ADOLPH T. HEISER, of Scranton, in the county of Lackawanna and State of Pennsylvania, have invented certain new and useful Improvements in Handles for Shovels, Spades, &c.; and I do hereby declare the following to be a full, clear, and exact description of the same, reference being had to the accompanying drawings, forming a part of this specification, and to the figures and letters of reference marked thereon.

My invention has for its object to provide a device for strengthening what are known as "wooden D-handles" for shovels, spades, scoops, and like implements, so as to prevent their being broken at a point necessarily the weakest, as such handles are ordinarily constructed; and it consists of the device which I will now proceed to describe.

In the drawings, Figure 1 is a perspective view of a wooden handle provided with my invention. Fig. 2 is a sectional view of the same on the line $x\,x$. Fig. 3 is a view of one of the strengthening-plates detached, and Fig. 4 is a view of a modification.

A represents an ordinary D-shaped shovel-handle, having the grasping portion B and the two side portions, C C. These side portions, C C, being necessarily quite small and subjected to great strain, are liable to and frequently do break at about the point $c$, thus rendering the rest of the handle useless, and as the handle is permanently attached to the blade, the whole shovel becomes useless. When the grain of the wood of which the handle is constructed does not run straight, and oftentimes when it is straight, the whole side C is apt to split off, and to guard against this two bolts or rods, D, are passed through the handle, the upper one through the part B and the lower one just below the open portion. The ends of these rods are ordinarily passed through countersunk washers, and then upset for the purpose of preventing their withdrawal. The rods do not, however, prevent the breaking of the part C at the point mentioned.

E represents my improved strengthening-plate, constructed as shown in Fig. 3, and one of them is to be placed on each side of the handle, as shown. These plates have the perforations E' E', one at each end, for the passage of the rods D, which perforations may, if desired, be countersunk, as shown, so that when the rods are headed up the heads will be below the surface of the plate. The outside of the plate is preferably slightly rounded, and the inside slightly concaved, so as to fit the handle, and may be provided with one or more spurs for entering the part C, and serving to hold the plate steady while the rods D are being headed. When the open space in, or the D part of, the handle is quite large, I prefer to employ plates long enough to extend down to the bend in the handle, and provided with two or more rods extending through below and one above the opening, as shown in Fig. 4.

The plates are preferably made of malleable iron, though any other material will suffice.

I claim as my invention—

1. The combination, with the wooden D-handle, of the two independent metal plates, one secured on each side of the same, substantially as described.

2. The herein-described strengthening-plate for wooden D-handles, having the perforations and the spurs or projections, substantially as described.

3. The combination, with the wooden D-handle, of the plates E, having the perforations and the rods D D, as set forth.

ADOLPH T. HEISER.

Witnesses:
JOHN A. MEARS,
F. W. MASON.